(12) United States Patent
Kakinuma

(10) Patent No.: US 12,548,781 B2
(45) Date of Patent: Feb. 10, 2026

(54) ELECTRODE CATALYST, AND ANION EXCHANGE MEMBRANE ELECTROCHEMICAL CELL

(71) Applicant: UNIVERSITY OF YAMANASHI, Kofu (JP)

(72) Inventor: Katsuyoshi Kakinuma, Kofu (JP)

(73) Assignee: UNIVERSITY OF YAMANASHI, Kofu (JP)

( * ) Notice: Subject to any disclaimer, the term of this patent is extended or adjusted under 35 U.S.C. 154(b) by 564 days.

(21) Appl. No.: 18/007,844

(22) PCT Filed: Jun. 7, 2021

(86) PCT No.: PCT/JP2021/021582
§ 371 (c)(1),
(2) Date: Dec. 2, 2022

(87) PCT Pub. No.: WO2021/251341
PCT Pub. Date: Dec. 16, 2021

(65) Prior Publication Data
US 2023/0299307 A1    Sep. 21, 2023

(30) Foreign Application Priority Data

Jun. 11, 2020 (JP) .................. 2020-101517
Mar. 18, 2021 (JP) .................. 2021-045028

(51) Int. Cl.
*H01M 4/90* (2006.01)
*C25B 11/031* (2021.01)
(Continued)

(52) U.S. Cl.
CPC ......... *H01M 4/9041* (2013.01); *C25B 11/031* (2021.01); *C25B 11/091* (2021.01);
(Continued)

(58) Field of Classification Search
CPC ....... H01M 2008/1095; H01M 4/8605; H01M 4/8657; H01M 4/9041; H01M 4/9075;
(Continued)

(56) References Cited

U.S. PATENT DOCUMENTS

2007/0037055 A1    2/2007   Yamada et al.
2007/0092784 A1    4/2007   Dopp et al.
(Continued)

FOREIGN PATENT DOCUMENTS

CN    102164652 A    8/2011
CN    102640335 A    8/2012
(Continued)

OTHER PUBLICATIONS

Machine translation TW201506046 (Year: 2015).*
(Continued)

*Primary Examiner* — Ictoria H Lynch
(74) *Attorney, Agent, or Firm* — Maier & Maier, PLLC

(57) ABSTRACT

An electrode catalyst including a void-containing body having a void, the void-containing body includes a core part and a skin layer covering the core part, the core part is structured with metal, and the skin layer is structured with an oxide containing Ni.

7 Claims, 19 Drawing Sheets

(51) Int. Cl.
   *C25B 11/091* (2021.01)
   *H01M 4/86* (2006.01)
   *C25B 1/04* (2021.01)
   *H01M 8/1004* (2016.01)

(52) U.S. Cl.
   CPC ....... *H01M 4/8605* (2013.01); *H01M 4/8657* (2013.01); *H01M 4/9075* (2013.01); *C25B 1/04* (2013.01); *H01M 8/1004* (2013.01)

(58) Field of Classification Search
   CPC ...... H01M 8/1004; Y02E 60/36; Y02E 60/50; Y02P 70/50
   See application file for complete search history.

(56) References Cited

U.S. PATENT DOCUMENTS

| | | |
|---|---|---|
| 2008/0280190 A1 | 11/2008 | Dopp et al. |
| 2010/0069228 A1 | 3/2010 | Dopp et al. |
| 2011/0177407 A1 | 7/2011 | Majima et al. |
| 2012/0295184 A1 | 11/2012 | Watanabe et al. |
| 2013/0101919 A1 | 4/2013 | Hiraiwa et al. |
| 2013/0101920 A1 | 4/2013 | Hiraiwa et al. |
| 2016/0017507 A1 | 1/2016 | Dai et al. |
| 2017/0346101 A1 | 11/2017 | Lee et al. |
| 2020/0164349 A1 | 5/2020 | Kakinuma et al. |
| 2020/0407860 A1 | 12/2020 | Mitsushima et al. |
| 2021/0339224 A1 | 11/2021 | Arata et al. |
| 2022/0170169 A1 | 6/2022 | Uchida et al. |
| 2025/0101614 A1* | 3/2025 | Rojas Herrera .... C25B 11/0771 |

FOREIGN PATENT DOCUMENTS

| | | | |
|---|---|---|---|
| CN | 106999912 A | 8/2017 | |
| CN | 108855184 A | 11/2018 | |
| JP | 2009-543674 A | 12/2009 | |
| JP | 2010-201387 A | 9/2010 | |
| JP | 2013-149616 A | 8/2013 | |
| JP | 2016081839 A * | 5/2016 | |
| JP | 2017-527693 A | 9/2017 | |
| TW | 201506046 A * | 2/2015 | ................ C08F 8/44 |
| WO | 2012/002310 A1 | 1/2012 | |
| WO | 2017/159820 A1 | 9/2017 | |
| WO | 2019/021904 A1 | 1/2019 | |
| WO | 2019/172160 A1 | 9/2019 | |
| WO | 2020/080400 A1 | 4/2020 | |
| WO | 2020/196236 A1 | 10/2020 | |

OTHER PUBLICATIONS

Xu et al., ACS Catalysis 2019, 9, 7-15 (Year: 2019).*
Machine translation JP2016081839A (Year: 2016).*
Office Action issued on Jun. 8, 2024, in corresponding Chinese Application No. 202180040419.8, 15 pages.
Extended Search Report issued on Jan. 24, 2024, in corresponding European Application No. 21820086.3, 8 pages.
Office Action issued on Oct. 26, 2024, in corresponding Chinese Application No. 202180040419.8, 13 pages.
Brunet et al, "Energy Storage Technology and Applications", China Machine Press, 1st Edition, STE Ltd, John Wiley & Sons, ISBN: 978-1-84821-183-4, May 31, 2018, with partial English translation. 5 pages.
Tong et al., "New Energy and the Fourth Industrial Revolution", China Economic Publishing House, 1st. Edition, ISBN: 978-7-5136-5792-1, Sep. 30, 2019, 6 pages.
International Search Report issued on Aug. 24, 2021, in corresponding International Application No. PCT/JP2021/021582, 7 pages.
S. Siracusanoa et al., "Nanosized IrOx and IrRuOx electrocatalysts for the O2 evolution reaction in PEM water electrolysers", Applied Catalysis B: Environmental 164 (2015) 488-495, Available online: Sep. 16, 2014, 8 pgs.
Chao Feng et al., "Fe-Based Electrocatalysts for Oxygen Evolution Reaction: Progress and Perspectives", ACS Catal. 10 (2020) 4019-4047, Published: Feb. 26, 2020, 29 pgs.
Lena Trotochaud et al., "Solution-Cast Metal Oxide Thin Film Electrocatalysts for Oxygen Evolution", Journal of the American Chemical Society 134 (2012) 17253-17261, Published: Sep. 19, 2012, 9 pgs.
Charles C. L. McCrory et al., "Benchmarking Heterogeneous Electrocatalysts for the Oxygen Evolution Reaction" Journal of the American Chemical Society 135 (2013) 16977-16987, Published: Oct. 30, 2013, 11 pgs.
Surya V. Devaguptapu et al., "Morphology Control of Carbon-Free Spinel NiCo2O4 Catalysts for Enhanced Bifunctional Oxygen Reduction and Evolution in Alkaline Media", ACS Appl. Mater. Interfaces 2017, 9, 44567-44578, Published: Dec. 6, 2017, 12 pgs.
Dongyu Xu et al., "Earth-Abundant Oxygen Electrocatalysts for Alkaline Anion-Exchange-Membrane Water Electrolysis: Effects of Catalyst Conductivity and Comparison with Performance in Three-Electrode Cells", ACS Catal. 9 (2019) 7-15, Published: Nov. 15, 2018, 9 pgs.
E. López-Fernandez et al., "Chemistry and Electrocatalytic Activity of Nanostructured Nickel Electrodes for Water Electrolysis", ACS Catal., vol. 10, American Chemical Society, Published: May 5, 2020, p. 6159-6170, 12 pgs.
International Preliminary Report on Patentability issued on Mar. 1, 2022, in corresponding International Application No. PCT/JP2021/021582, 14 pages.

* cited by examiner

ELECTRODE CATALYST, AND ANION EXCHANGE MEMBRANE ELECTROCHEMICAL CELL

FIELD

The present invention relates to an electrode catalyst and an anion exchange membrane electrochemical cell. The electrode catalyst of the present invention can be used, for example, as a catalyst for electrochemical reactions in an anion exchange membrane electrochemical cell. Examples of the anion exchange membrane electrochemical cell include an anion exchange membrane water electrolysis cell and an anion exchange membrane fuel cell.

BACKGROUND

In water electrolysis hydrogen production using an anion exchange membrane, a hydrogen reaction ($H_2O + e^- \rightarrow \frac{1}{2}H_2 + OH^-$) occurs at a cathode, and an oxygen generation reaction ($OH^- \rightarrow \frac{1}{4}O_2 + \frac{1}{2}H_2O + e^-$) occurs at an anode in the opposite position. Currently, noble metal oxides ($IrO_x$) are used as electrode catalysts. To improve catalytic activity, an attempt has been made to replace $IrO_x$ with $IrRuO_x$. This has reduced the amount of Ir used by 30%, and its overvoltage has been reduced to about 0.2 V (Non Patent Literature 1). However, there is a need to develop non-noble metal-supported catalysts that do not use Ir, which is expensive and scarce in reserves. In Patent Literature 1, a catalyst in which non-noble metal $Ni(OH)_2$ nanoparticles are supported on conductive carbon has been developed, but the addition of carbon is necessary to provide conductivity and to form gas diffusion pathways. The accelerated degradation of carbon at operating potential (1.7 to 1.8 V) will be a major issue in its practical use. The conductivity issue has been overcome by using NiFe metal nanoparticles and the like, and the overvoltage has been successfully reduced to less than that of $IrO_x$. However, the electrode tends to become dense, and carbon must be added to provide diffusion pathways (void) for the oxygen generated (Non Patent Literature 2). In the NiCoO and NiFeO systems, the overvoltage at the anode is successfully reduced compared to $IrO_x$ (Non Patent Literatures 3 and 4). However, in the NiCoO system, the formation of gas diffusion pathways and the improvement of the specific surface area increase the resistance to 30Ω at the operating potential (1.6 V), causing conductivity issues (Non Patent Literature 5). The NiFeO system has the issue of degradation due to the oxidation of Fe as the potential increases (Non Patent Literature 6).

CITATION LIST

Patent Literature 1: JP-A-2017-527693
Non Patent Literature 1: Appl. Catal B 164 (2015) 488-495
Non Patent Literature 2: ACS Catal. 10 (2020) 4019-4047
Non Patent Literature 3: JACS 134 (2012) 17253-17261
Non Patent Literature 4: JACS 135 (2013) 16977-16987
Non Patent Literature 5: ACS Appl. Mat. Interfaces (2017) 44567
Non Patent Literature 6: ACS Catal. 9 (2019) 7-15

SUMMARY

The present invention has been made in consideration of the aforementioned circumstances and provides an electrode catalyst that is excellent in durability, material conductivity, and electrical conductivity and can be produced at a low cost.

According to the present invention, there is provided an electrode catalyst structured with a void-containing body having a void, the void-containing body comprises a core part and a skin layer covering the core part, the core part is structured with metal, and the skin layer is structured with an oxide containing Ni.

The electrode catalyst of the present invention has excellent durability because it does not require the addition of carbon and is structured with a metal in the core part and oxide in the skin layer. The electrode catalyst also has excellent material conductivity because it is structured with the void-containing body with a void ratio of at least 20%. Furthermore, this electrode catalyst has excellent electrical conductivity because the core is metal. In addition, this electrode catalyst can be produced at a low cost because noble metals are not essential components.

DETAILED DESCRIPTION

Hereinafter, the embodiments of the present invention will be described with reference to the drawings. Various features described in the embodiments shown below can be combined with each other. Furthermore, the invention is independently established for each feature.

1. Electrochemical Cell 10

Figure 1:
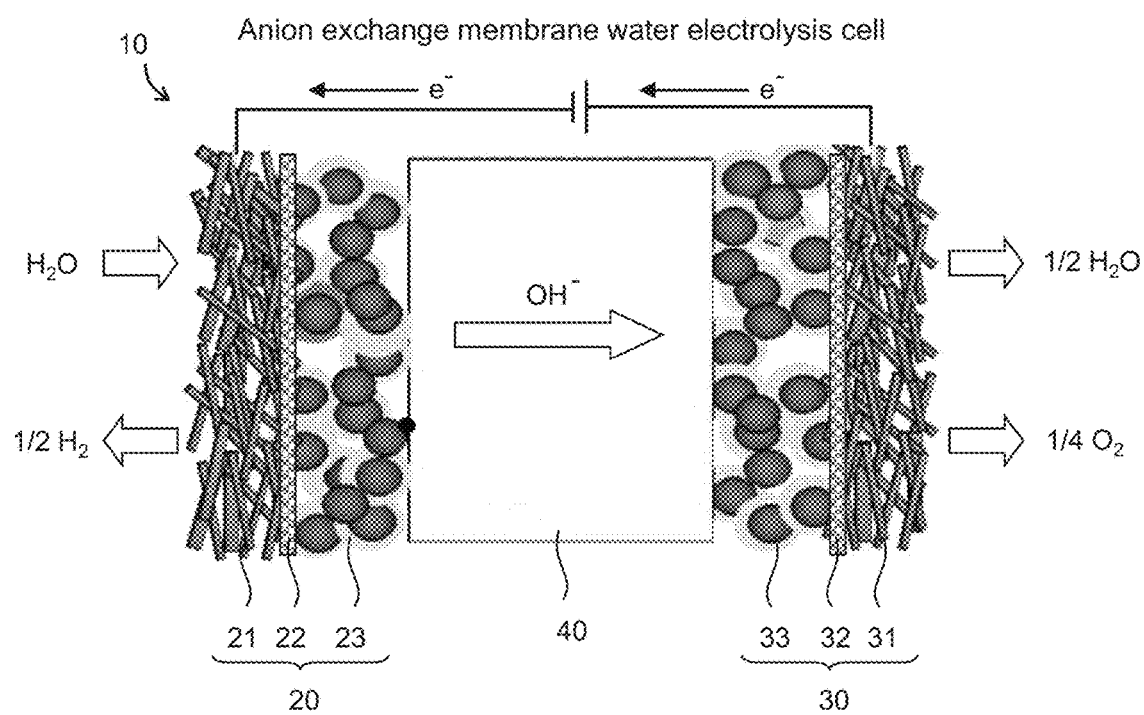
FIG. 1 is a configuration diagram of an electrochemical cell 10 in water electrolysis operation.

FIG. 1 shows the configuration of an anion exchange membrane electrochemical cell 10 according to an embodiment of the present invention. The electrochemical cell 10 comprises a cathode 20, an anode 30, and an anion exchange membrane 40 placed between them.

As shown in FIG. 1, when a voltage is applied between the cathode 20 and the anode 30d and water is supplied to the cathode 20 in the electrochemical cell 10, cathodic and anodic reactions described below occur, producing hydrogen from the cathode 20 and water and oxygen from the anode 30. Electrons move from the anode 30 to the cathode 20 through a wiring, and OH⁻ moves from the cathode 20 to the anode 30 through the anion exchange membrane 40. In this case, the electrochemical cell 10 is an anion exchange membrane water electrolysis cell and is in water electrolysis operation.

Cathodic reaction: $H_2O + e^- \rightarrow \frac{1}{2}H_2 + OH^-$

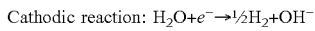

Anodic reaction: $OH^- \rightarrow \frac{1}{2}H_2O + \frac{1}{4}O_2 + e^-$

Figure 2:
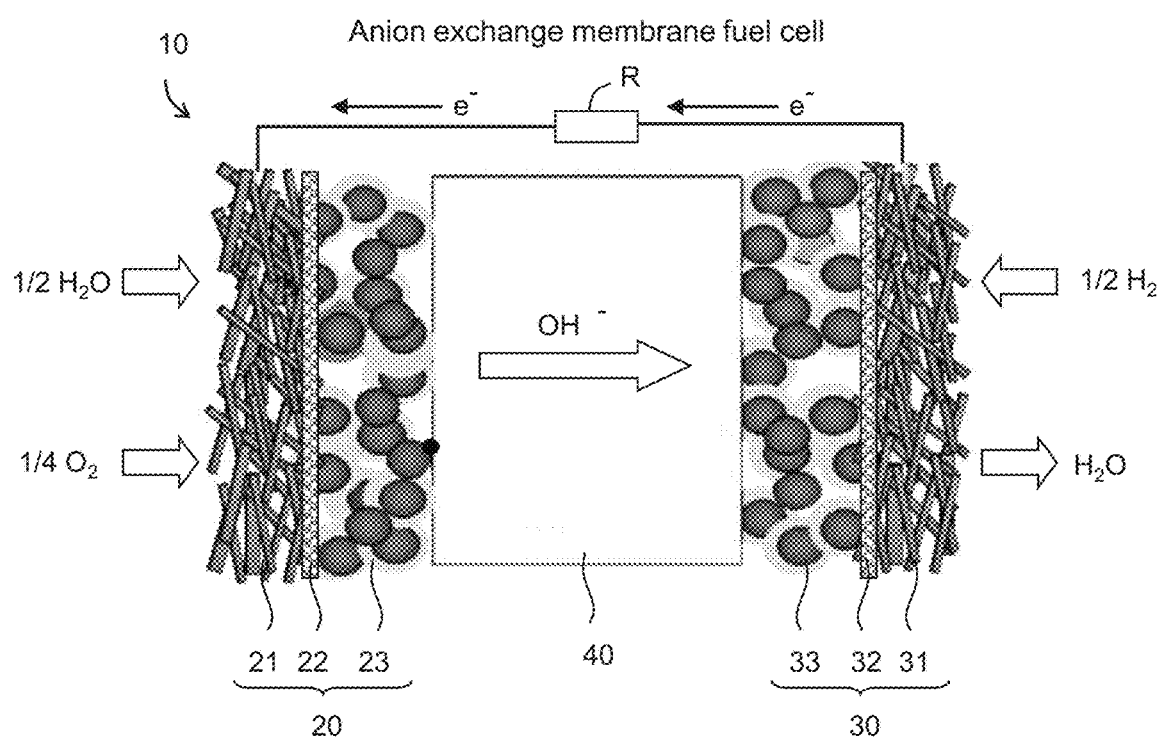
FIG. 2 is a configuration diagram of the electrochemical cell 10 in electricity generating operation.

As shown in FIG. 2, when a load R is connected between the cathode 20 and the anode 30 and water and oxygen are supplied to the cathode 20 and hydrogen to the anode 30 in the electrochemical cell 10, an electromotive force is generated by the cathodic and anodic reactions described below, and water is produced. The generated electromotive force causes electrons to move from the anode 30 to the cathode 20 through the load R, and OH⁻ to move from the cathode 20 to the anode 30 through the anion exchange membrane 40. In this case, the electrochemical cell 10 is an anion exchange membrane fuel cell and is in electricity generating operation.

Cathodic reaction: $\frac{1}{2}H_2O + \frac{1}{4}O_2 + e^- \rightarrow OH^-$

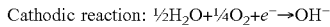

Anodic reaction: $\frac{1}{2}H_2 + OH^- \rightarrow H_2O + e^-$

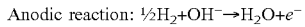

The cathodic reaction in the electricity generating operation is the reverse reaction of the anodic reaction in the water electrolysis operation. The anode reaction in the electricity-generating operation is the reverse reaction of the cathodic reaction in the water electrolysis operation.

Thus, the electrochemical cell 10 can be operated as a water electrolysis cell or as a fuel cell. Thus, the electrochemical cell 10 can be efficiently operated by, for example, operating the electrochemical cell 10 as a water electrolysis cell using surplus electricity generated by solar photovoltaic generation to generate and store hydrogen and oxygen and by operating the electrochemical cell 10 as a fuel cell using the stored hydrogen and oxygen when electricity is needed and generating the electromotive force.

The cathode 20 comprises a diffusion layer 21, a microporous layer 22, and a catalyst layer 23. The anode 30 comprises a diffusion layer 31, a microporous layer 32, and a catalyst layer 33. The diffusion layers 21 and 31 are structured with a porous material and have a function to diffuse fluid (liquid or gas) supplied to the catalyst layers 23 and 33. The microporous layers 22 and 32 have functions to further diffuse the fluid supplied to the catalyst layers 23 and 33 and to efficiently remove the liquid generated in the catalyst layers 23 and 33. The catalyst layers 23 and 33 have a function to promote an electrochemical reaction (the cathodic or anodic reactions) by virtue of a catalyst.

One or both of the catalyst layers 23 and 33 are structured with an electrode catalyst 50 of the present invention described below. When one of the catalyst layers 23 and 33 is structured with the electrode catalyst 50, the other of the catalyst layers 23 and 33 may be structured with any catalyst capable of promoting a desired electrochemical reaction, and for example, a catalyst, such as $IrO_x$, mentioned in the prior art can be used. When both catalyst layers 23 and 33 are structured with the electrode catalyst 50, the composition and structure of the electrode catalyst 50 may be the same or different from each other.

2. Electrode Catalyst 50

Figure 3:
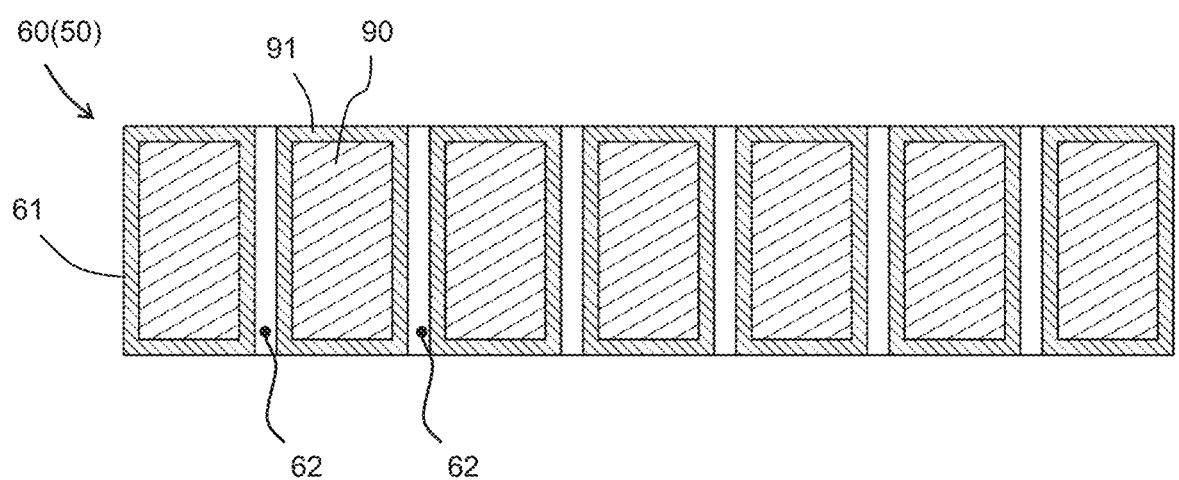
FIG. 3 is a cross-section view of a porous material 60 that constitutes an electrode catalyst 50.
Figure 4:
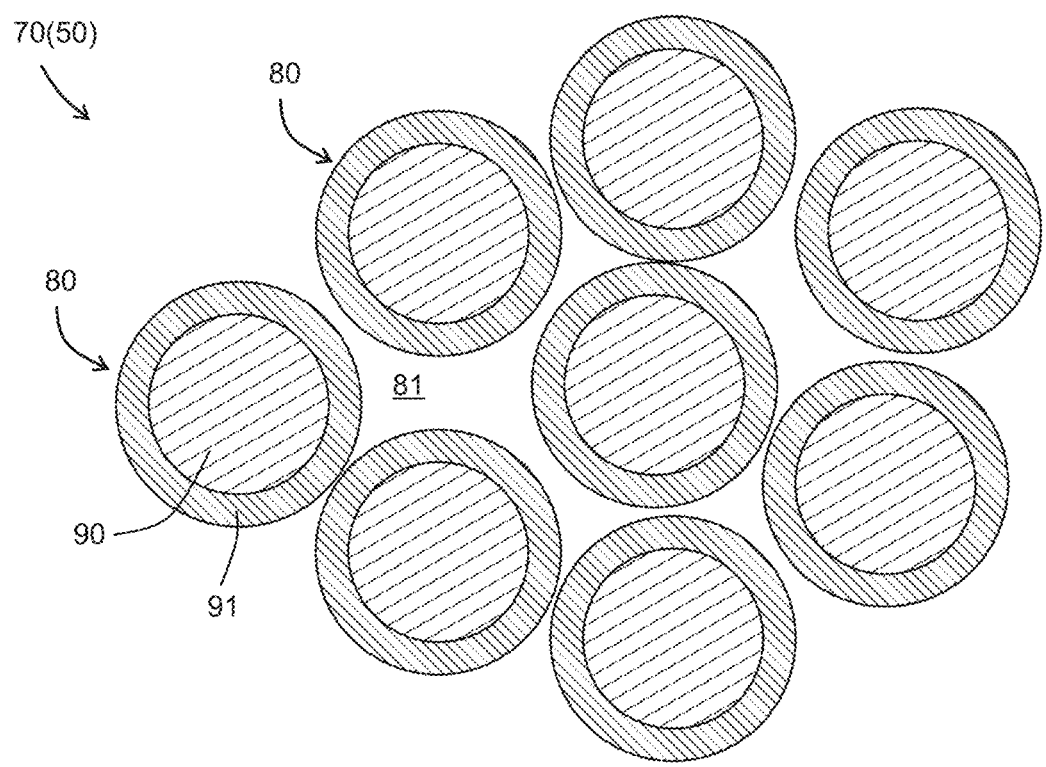
FIG. 4 is a cross-section view of powder 70 that constitutes the electrode catalyst 50.

The electrode catalyst 50 is structured with a void-containing body having a void. Examples of the void-containing material include a porous material 60, as shown in FIG. 3, and powder 70, as shown in FIG. 4. In the present invention, the void-containing body is formed by the catalyst itself, so it is not necessary to support the catalyst on a support as in the prior art.

The porous material 60 is structured by forming many pores 62 on a substrate 61, and the pores 62 are the void. The pores 62 may be regularly or irregularly arranged. The pores 62 may be regular (e.g., linear) or irregular in shape. The pores 62 may or may not penetrate the substrate 61. The powder 70 is an aggregate of fine particles 80. The gap 81 between the fine particles 80 and the gap inside the fine particles are the void. The fine particle 80 may be spherical or other shapes. When the void-containing body is the powder 70, the void-containing body is structured with the fine particles 80 themselves, which act as the catalyst.

A void ratio of the void-containing body is preferably 20% or more, and preferably 50% or more. The void ratio is, for example, 20 to 90%, particularly, for example, 20, 25, 30, 35, 40, 45, 50, 55, 60, 65, 70, 75, 80, 85, or 90%, and may be in the range between the two values exemplified herein. The void ratio can be calculated by bulk density/true density. The void ratio of the powder can be measured in a molded state in a uniaxial pressure molding machine (Molded body size: 5 mm×5 mm×30 mm, molding pressure: 2 MPa or less).

The void-containing body comprises a core part 90 and a skin layer 91 covering the core part 90. When the void-containing body is the porous material 60, the porous material 60 comprises the core part 90 and the skin layer 91. When the void-containing body is the powder 70, each of the fine particles 80 comprises the core part 90 and the skin layer 91.

The core part 90 is formed of metal, and the skin layer 91 is structured with an oxide containing Ni. Since the skin layer 91 contains NiO bonds, it generates NiOOH (active point) in an alkaline aqueous solution, which promotes the electrochemical reaction. The core part 90, on the other hand, is formed of metal and is highly electrically conductive. The metal of the core part 90 may or may not contain Ni. When the metal of the core part 90 contains Ni, the skin layer 91 structured with the oxide containing Ni can be formed by reducing the entire void-containing body and then oxidizing only its surface, which facilitates production. The skin layer 91 may be formed by coating the oxide containing Ni to cover the core part 90. In this case, the core part 90 may not contain Ni.

A thickness of the skin layer 91 is, for example, 0.1 to 50 nm, and preferably 1 to 10 nm. The thickness can be particularly 0.1, 0.5, 1, 5, 10, 15, 20, 30, 40, or 50 nm, and may range between the two values exemplified herein.

The electrical conductivity of the electrode catalyst 50 is preferably 0.001 S/cm or more, more preferably 0.01 S/cm or more, and even more preferably 0.1 S/cm or more. The electrical conductivity is 0.001 to 1 S/cm, and particularly, for example, 0.001, 0.002, 0.005, 0.01, 0.02, 0.05, 0.1, 0.2, 0.5, or 1 S/cm, and may be in the range between the two values exemplified herein.

The metal of the core part 90 and the skin layer 91 preferably contain a transition metal with a smaller atomic number than Ni, as a transition metal other than Ni. Examples of such transition metal include Co, Fe, Mn, Cr, V, Ti, Sc, and the like, and Co or Fe is preferable. When such transition metal is contained, the Fermi level is lowered, and the electrochemical reaction is promoted. A ratio of the transition metal to the total of Ni and the transition metal is preferably 5 to 95 atomic %, and more preferably 10 to 80 atomic %. The ratio is, particularly, for example, 5, 10, 15, 20, 25, 30, 35, 40, 45, 50, 55, 60, 65, 70, 75, 80, 85, 90, or 95 atomic %, and may range between the two values exemplified herein.

In an oxygen evolution reaction ("OER") in water electrolysis operation, the ratio of the transition metal to the total of Ni and the transition metal is preferably 5 to 80 atomic %, and especially preferably 5 to 35 atomic %. For a hydrogen evolution reaction ("HER") in water electrolysis operation, the ratio of the transition metal to the total of Ni and the transition metal is preferably 25 to 80 atomic %, and particularly preferably 25 to 50 atomic %. Co is especially preferable as the transition metal.

Figure 5:
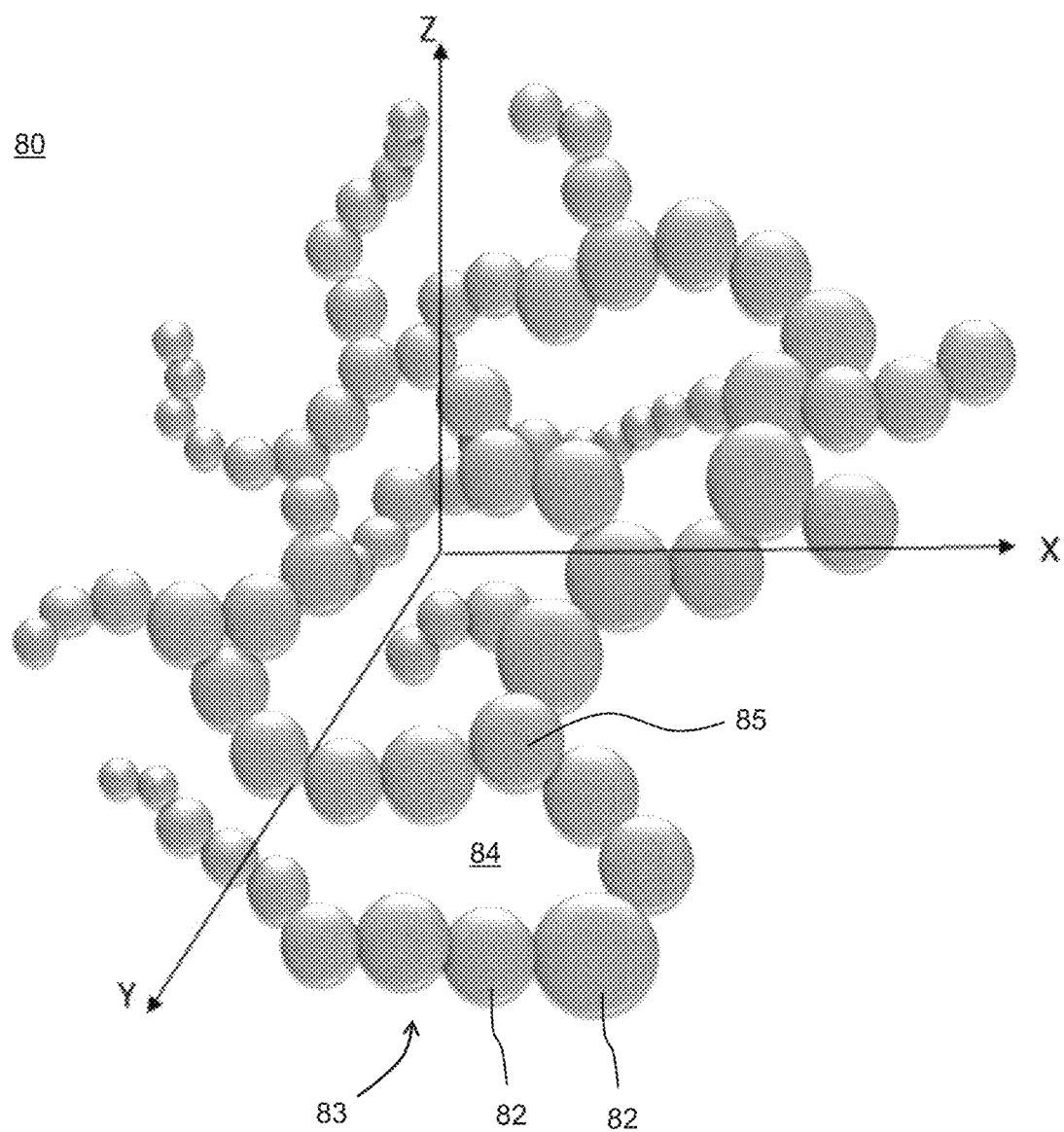
FIG. 5 is a perspective view of fine particles 80 with fused-aggregate network structure.

As shown in FIG. 5, the fine particles 80 are preferably a structure having a chain part 83 structured with a plurality of primary particles 82 being fusion bonded in a chain (hereinafter, "fused-aggregate network structure"). In this case, a region surrounded by the chain parts 83 is a void 84. It is also preferable that the fused-aggregate network structure has branch structures in which the chain part 83 is branched at a branching point 85. In this case, the void 84 is easy to form. In addition, since the fused-aggregate network structure is formed by the catalyst itself, it is not necessary to support the catalyst on a support as in the prior art.

Figure 6:
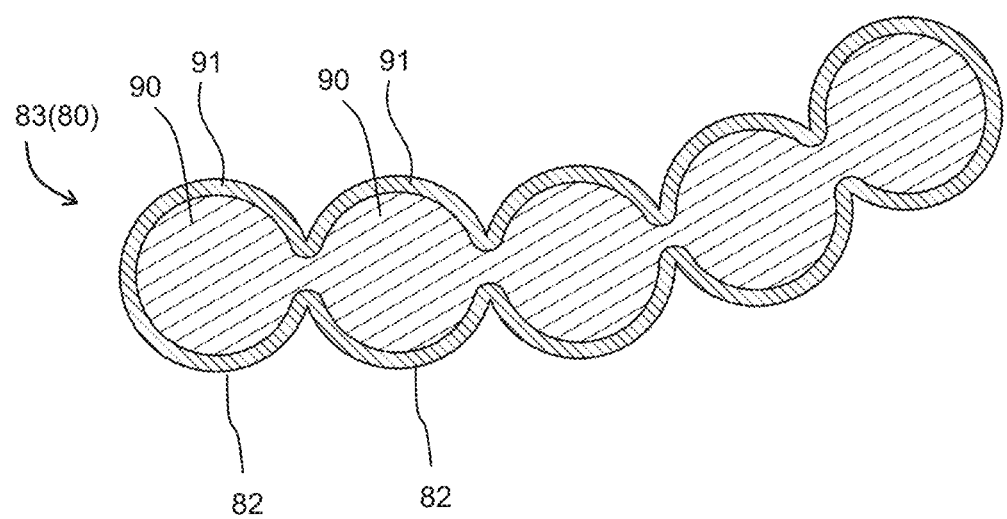
FIG. 6 is a cross-section view of the fine particles 80 with fused-aggregate network structure.
Figure 7:
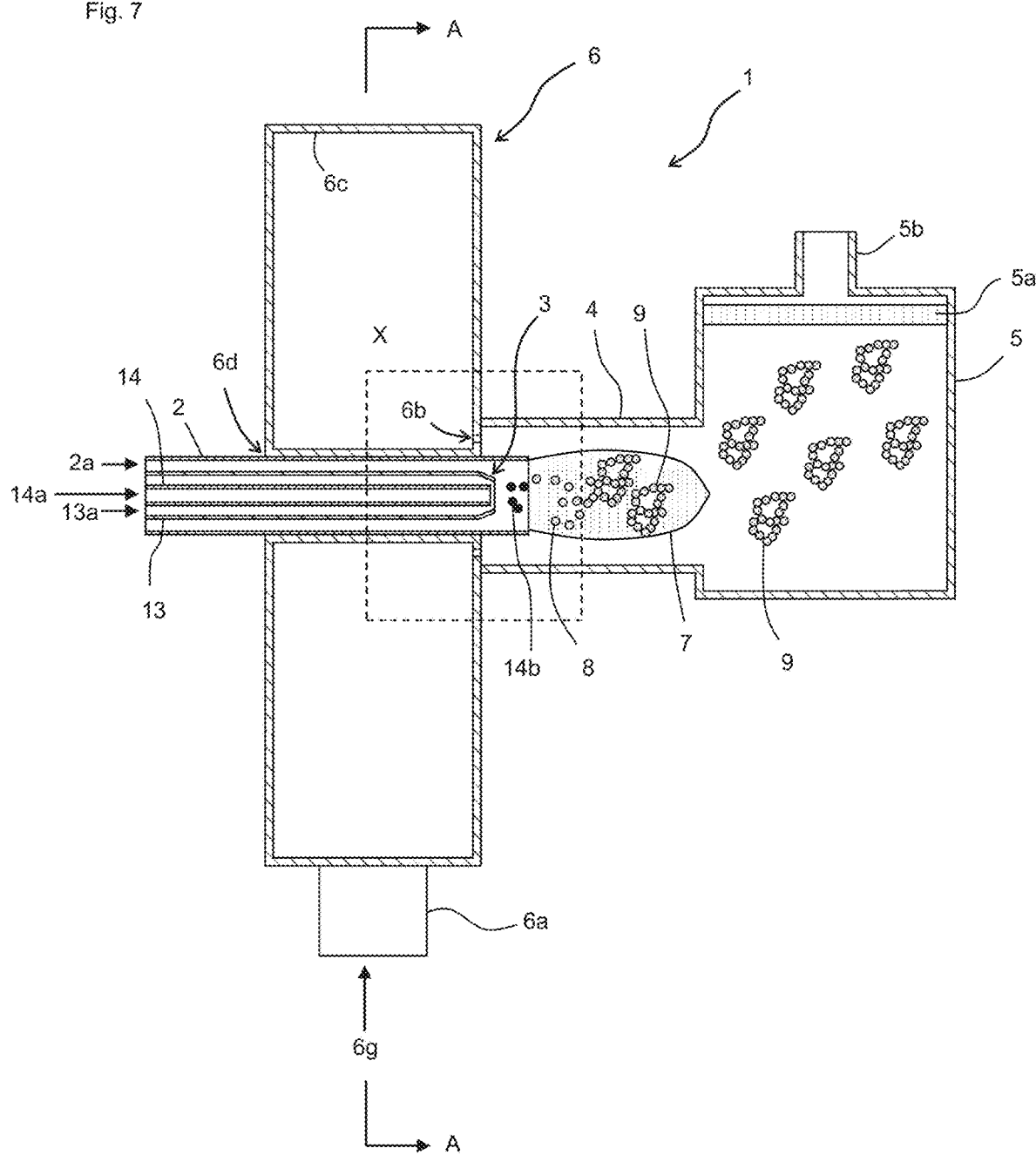
FIG. 7 is a cross-section view of a producing apparatus 1 for producing powder, through the center of a burner 2.
Figure 8:
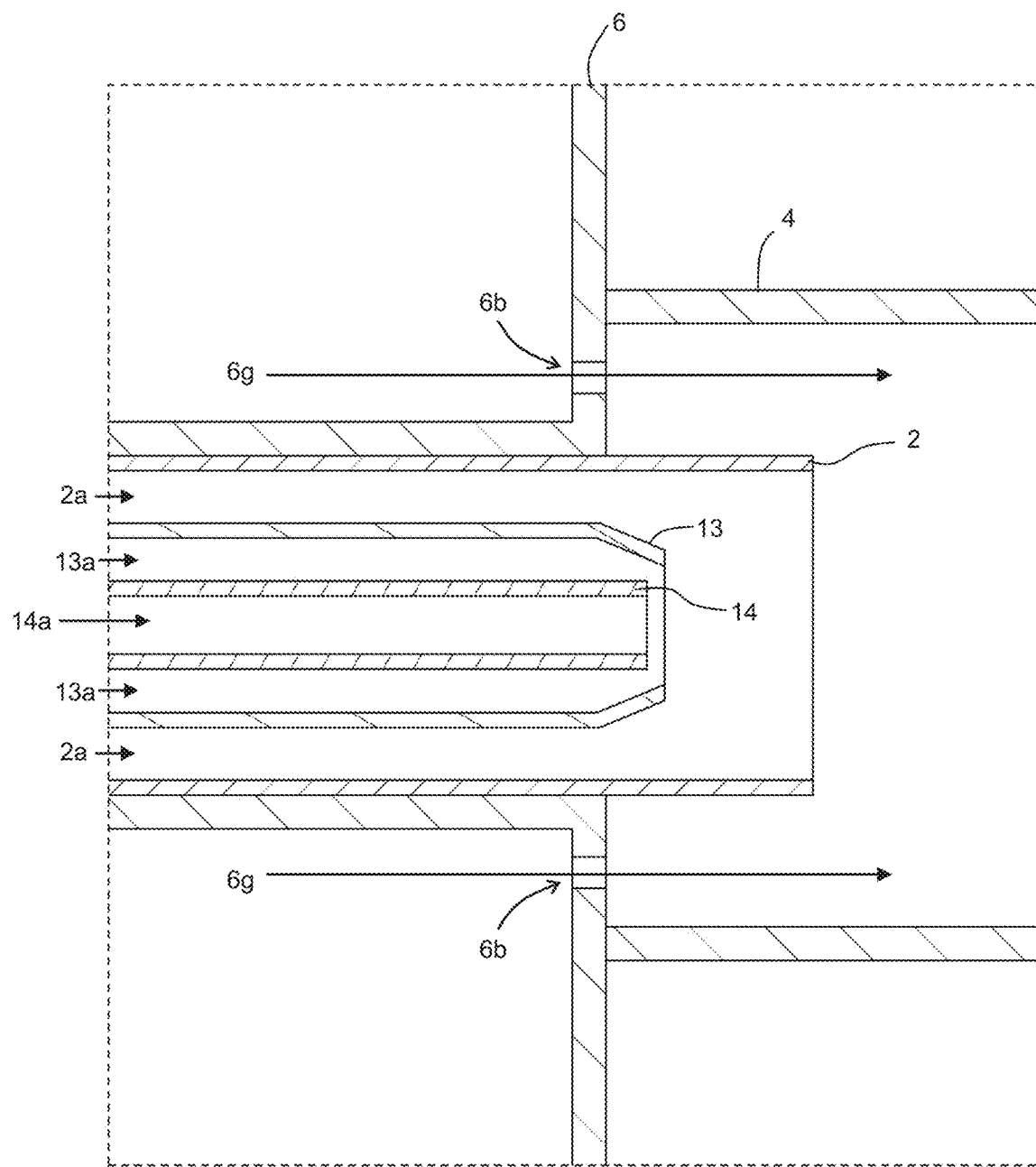
FIG. 8 is an enlarged view of a region X in FIG. 7.
Figure 9:
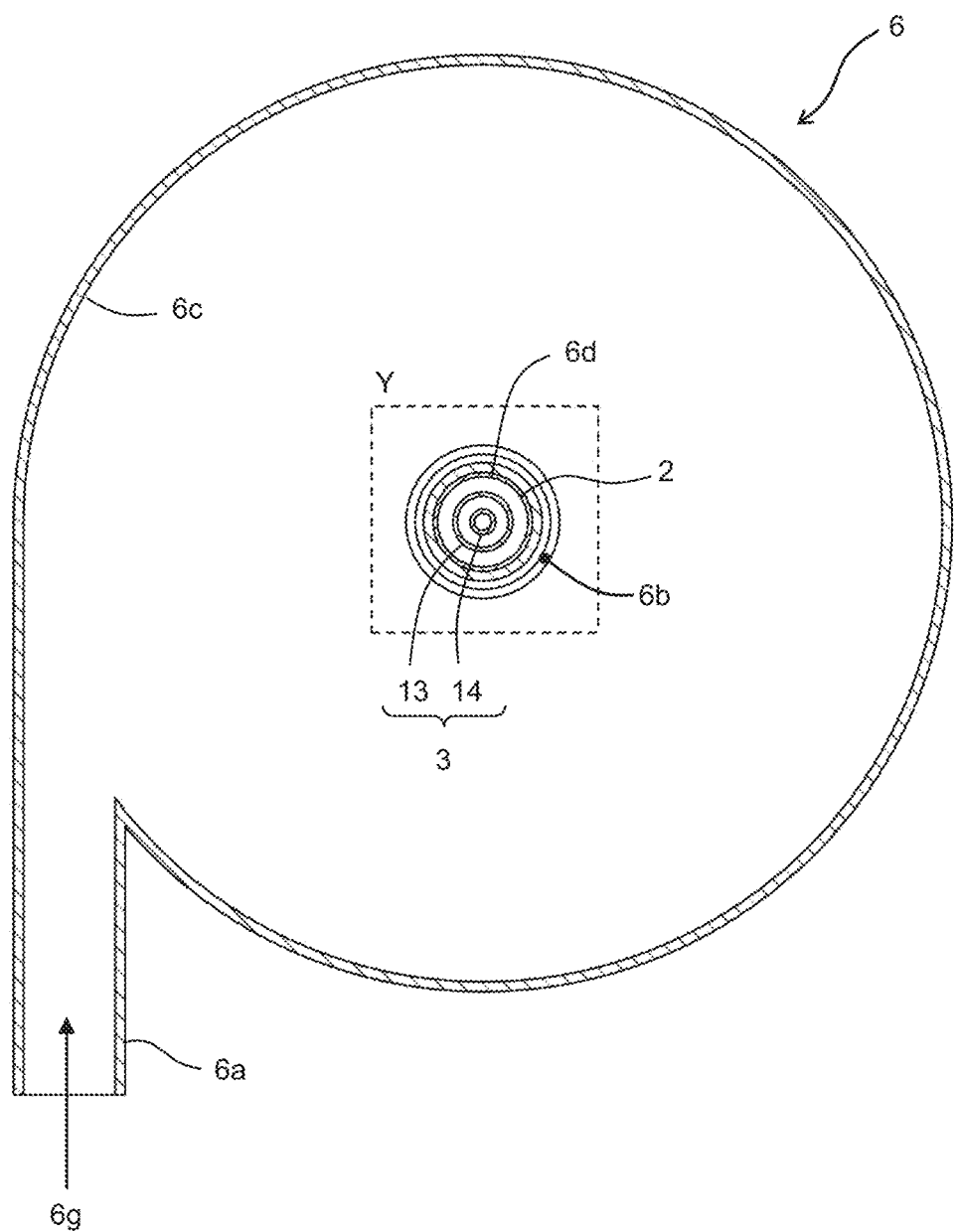
FIG. 9 is a cross-section view along an A-A line in FIG. 7.
Figure 10:
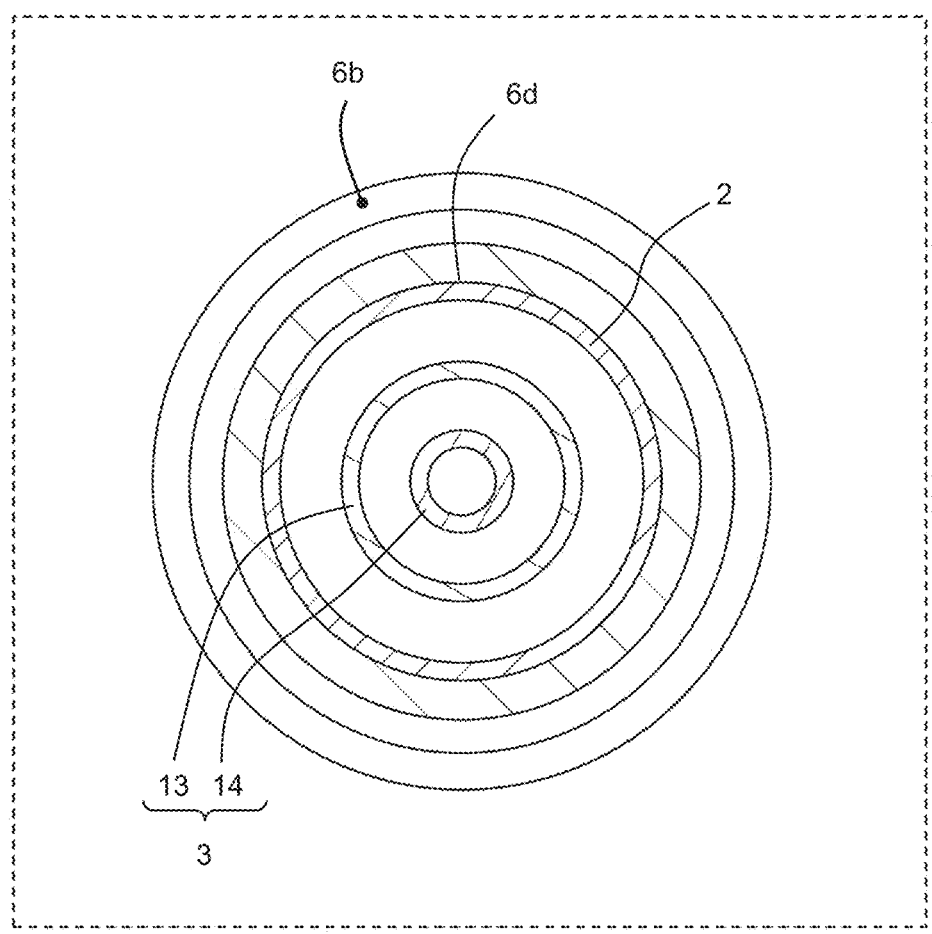
FIG. 10 is an enlarged view of a region Y in FIG. 9.

As shown in FIG. 6, each of the plurality of primary particles 82 structuring the chain part 83 comprises the core part 90 and the skin layer 91, and the core parts 90 of the adjacent primary particles 82 are preferably connected to each other. In this case, electrical conductivity is particularly improved.

Figure 11A:
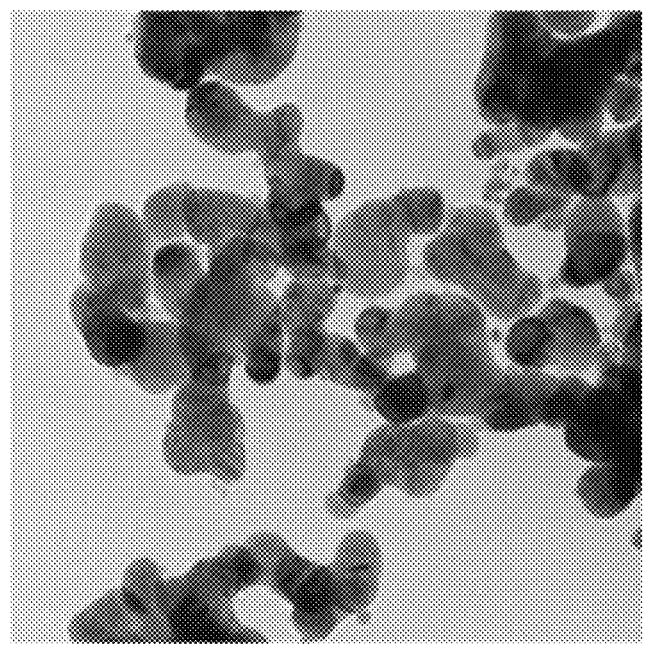
FIG. 11A is a TEM image of oxide particles obtained in Examples.
Figure 11B:
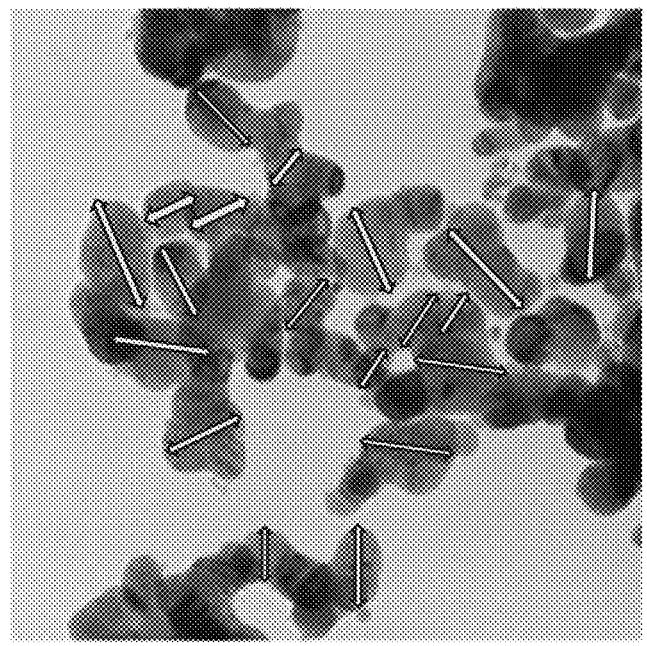
FIG. 11B is a diagram in which arrows indicating primary particle diameters of primary particles are superimposed on the TEM image in FIG. 11A.

An average size of the primary particles 82 is preferably 1 to 100 nm, more preferably 5 to 40 nm, and even more preferably 10 to 20 nm. The average size is particularly, for example, 1, 5, 10, 15, 20, 25, 30, 35, 40, 50, or 100 nm, and may range between the two values exemplified herein. The average size of the primary particles 82 can be determined by an arithmetic mean of the primary particle diameters of 10 or more of the primary particles 82. The primary particle diameter can be measured using the TEM image as shown in FIG. 11A and FIG. 11B. In the TEM image shown in FIG. 11A, dark-colored areas indicate a part where multiple primary particles overlap. For the measurement of the primary particle diameter, a particle that is relatively light in color and whose outer circumference can be identified is focused on, and a value at which a distance between two points on the outer circumference of the particle is the longest (a length of the arrow in FIG. 11B) is determined as the primary particle diameter.

An average particle diameter of the fine particles 80 is 0.1 μm to 4 μm, preferably 0.5 μm to 2 μm. The average particle diameter of the fine particles 80 can be measured by a laser diffraction/scattering particle diameter distribution measuring device.

A specific surface area of the powder 70 is preferably 10 $m^2/g$ or more. The specific surface area is, for example, 10 to 50 $m^2/g$, particularly, for example, 10, 15, 20, 25, 30, 35, 40, 45, or 50 $m^2/g$, and may be in the range between the two values exemplified herein.

A repose angle of the powder 70 is preferably 50 degrees or less, and more preferably 45 degrees or less. In this case, the powder has the same degree of fluidity as flour and is easy to handle. The repose angle is, for example, 20 to 50 degrees, particularly, for example, 20, 25, 30, 35, 40, 45, or 50 degrees, and may be in the range between the two values exemplified herein. The repose angle can be determined by a drop volume method.

3. Production Method of Electrode Catalyst 50

When the electrode catalyst 50 is structured with the powder 70, which is the aggregate of the fine particles 80 having the fused-aggregate network structure, the electrode catalyst 50 can be produced by a method that comprises a powder forming step and a reducing and surface oxidizing process. Each process is described in detail below.

3-1. Powder Forming Step

First, FIGS. 7 to 10 will be used to describe a producing apparatus 1 which can be used to produce the powder. The producing apparatus 1 comprises a burner 2, a raw material supplying unit 3, a reaction tube 4, a collector 5, and a gas reservoir 6. The raw material supplying unit 3 comprises an outer tube 13 and a raw material distribution tube 14.

The burner 2 is tubular in shape, and the raw material supplying unit 3 is arranged in the burner 2. Burner gas 2*a* is distributed between the burner 2 and the outer tube 13. The burner gas 2*a* is used to form a flame 7 at the tip of the burner 2 by ignition. The flame 7 creates a high temperature region of 1000° C. or more. The burner gas 2*a* preferably contains a combustible gas such as propane, methane, acetylene, hydrogen, or nitrous oxide. In one example, a gas mixture of oxygen and propane gas can be used as the burner gas 2*a*. The temperature in the high temperature region is, for example, 1000 to 2000° C., and is particularly, for example, 1000, 1100, 1200, 1300, 1400, 1500, 1600, 1700, 1800, 1900, or 2000° C., and may be in the range between the two values exemplified herein.

A raw material solution 14*a* for producing the powder is distributed in the raw material distribution tube 14. A solution containing a Ni compound and, if necessary, a compound of transition metals (e.g., Co, Fe) is used as the raw material solution 14*a*. Examples of the compounds include fatty acid metal salts (e.g., fatty acid Ni, fatty acid Co, fatty acid Fe). The carbon number of the fatty acid is, for example, 2 to 20, preferably 4 to 15, and even more preferably 6 to 12. Octylic acid is preferrable as the fatty acid.

In the raw material solution 14*a*, the fatty acid metal salt is preferably dissolved or dispersed in a non-aqueous solvent. Examples of the non-aqueous solvent include organic solvents represented by turpentine. If moisture is contained in the raw material solution 14a, the fatty acid metal salts may undergo hydrolysis and degrade.

Mist gas 13a, which is used to mist the raw material solution 14a, is distributed between the outer tube 13 and the raw material distribution tube 14. When the mist gas 13a and the raw material solution 14a are jetted together from the tip of the raw material supplying unit 3, the raw material solution 14a is misted. The mist 14b of the raw material solution 14a is sprayed into the flame 7, and the fatty acid metal salt in the raw material solution 14a undergoes a thermal decompose reaction in the flame 7 to produce an oxide powder, which is an aggregate of oxide particles 9 having the chain parts structured by fusion bonding crystallites 8 of an oxide into a chain. The crystallites 8, the oxide particles 9, and the oxide powder undergo the reducing and surface oxidizing process to yield the primary particles 82, the fine particles 80, and the powder 70, respectively. The mist gas 13a is, in one example, oxygen.

The reaction tube 4 is provided between the collector 5 and the gas reservoir 6. The flame 7 is formed in the reaction tube 4. The collector 5 is provided with a filter 5a and a gas discharging portion 5b. A negative pressure is applied to the gas discharging portion 5b. This generates a flow that flows towards the gas discharging portion 5b in the collector 5 and the reaction tube 4.

The gas reservoir 6 is tubular in shape and comprises a cold gas introducing portion 6a and a slit 6b. A cold gas 6g is introduced into the gas reservoir 6 from the cold gas introducing portion 6a. Since the cold gas introducing portion 6a is oriented along the tangent line of the inner peripheral wall 6c of the gas reservoir 6, the cold gas 6g introduced into the gas reservoir 6 through the cold gas introducing portion 6a swirls along the inner peripheral wall 6c. A burner insertion hole 6d is provided in the center of the gas reservoir 6. The burner 2 is inserted through the burner insertion hole 6d. The slit 6b is provided at a position adjacent to the burner insertion hole 6d so as to surround the burner insertion hole 6d. Therefore, when the burner 2 inserted through the burner insertion hole 6d, the slit 6b is disposed to surround the burner 2. The cold gas 6g in the gas reservoir 6 is driven by the negative pressure applied to the gas discharging portion 5b and is discharged through the slit 6b toward the reaction tube 4. The cold gas 6g can be any gas capable of cooling the generated metal oxide, preferably an inert gas, e.g., air.

After the oxide particles 9 exit the flame 7, the oxide particles 9 are immediately cooled by the cold gas 6g, thus allowing to maintain the structure having the chain part. The cooled oxide particles 9 are captured and collected by the filter 5a. The captured oxide particles 9 may be subjected to heat treatment at 400 to 1000° C. to adjust to the desired primary particle diameter.

3-2. Reducing and Surface Oxidizing Process

The oxide particles 9, which constitute the oxide powder obtained in the above step, are entirely oxide and have poor electrical conductivity. Therefore, in this step, after reducing the oxide particles 9 so that their entirety becomes metal, only the surface is oxidized to form the metal core part 90 and the oxide skin layer 91. Consequently, the electrode catalyst 50 structured with the powder 70, which is the aggregate of the fine particles 80 with the fused-aggregate network structure can be obtained.

The reduction of the oxide particles 9 can be performed by heat treatment of the oxide particles 9 under a hydrogen-containing atmosphere. The hydrogen-containing atmosphere is an atmosphere containing hydrogen, preferably one in which the hydrogen is diluted with an inert gas (e.g., nitrogen). A hydrogen content in the atmosphere is, for example, 0.5 to 50%. A heat treatment temperature is preferably 20 to 500° C. This process reduces the oxide particles 9 to obtain the metal fine particles. Then, after the reduction, the surface of the metal fine particles can be oxidized by holding them in nitrogen that contains trace amounts of oxygen during slow cooling to room temperature. A concentration of oxygen is preferably 0.5 to 50 ppm.

EXAMPLES

The electrode catalysts were produced by the following method, and various evaluations were conducted.

1. Production of Electrode Catalyst 50

1-1. Examples 1 to 4 ($Ni_{1-x}Co_xO$)

1-1-1. Powder Forming Step

By using the producing apparatus 1 shown in FIG. 7 to FIG. 10, the electrode catalyst 50 was produced. As the burner gas 2a, gas prepared by blending 5 L/min of oxygen and 1 L/min of propane gas was used. This gas was ignited to form the flame (chemical flame) 7 of 1600° C. or more at the tip of the burner 2. The raw material solution 14a was prepared by blending Ni octylate and Co octylate by a predetermined ratio, and then the blend was further combined with mineral spirit turpentine and dissolved. Ni octylate and Co octylate were blended so that the atomic ratio x of Co to the total of Ni and Co was 0, 0.2, 0.4, or 0.6 (Example 1, Example 2, Example 3, and Example 4, respectively). Oxygen was used as the mist gas 13a. 9 L/min of the mist gas 13a and 3 g/min of the raw material solution 14a were blended and sprayed from the tip of the raw material supplying unit 3, which is a spray nozzle (atomizer), towards the central part of the flame, thereby allowing combustion of the blend and generation of the oxide powder which is the aggregate of the particles 9. During such, negative pressure was applied to the gas discharging portion 5b, the air was sucked through the slit 6b at a flow rate of 170 L/min, and the generated powder was collected in the collector 5 (with the filter 5a). The raw material supplying unit 3 has a double-tube structure (overall length of 322.3 mm). Oxygen gas is supplied from the outer tube 13, and the raw material solution 14a is supplied to the raw material distribution tube 14. A fluid nozzle and an air nozzle were provided at the tip of the raw material distribution tube 14, and the raw material solution 14a was converted into mist 14b at the nozzles.

The general formula of the oxide powder obtained is $Ni_{1-x}Co_xO$. The TEM image of the oxide particles 9 contained in the powder obtained for x=0.4 is shown in FIG. 11A. It can be seen that the oxide particles 9 have the chain parts structured with the crystallites 8 being fusion bonded to a chain.

1-1-2. Reducing and Surface Oxidizing Process

Then, the reduction and surface oxidation were performed on the oxide powder obtained in the above process to form the metal core part 90 and the oxide skin layer 91. inconsequently, the electrode catalyst 50 structured with the powder 70, which is the aggregate of the fine particles 80 with the fused-aggregate network structure was obtained.

The oxide particles 9 was reduced by heat treatment at 400° C. for 2 hours in the hydrogen-containing atmosphere (atmosphere of the gas mixture containing hydrogen and nitrogen, the hydrogen content of 1%.). The surface oxidation was performed by holding them in nitrogen that contains trace amounts of oxygen during slow cooling to room temperature after reduction. The concentration of oxygen was set at 5 ppm.

1-2. Example 5 ($Ni_{0.8}Mn_{0.2}O$), Example 6 ($Ni_{0.8}Fe_{0.2}O$)

The electrode catalysts 50 of Examples 5 to 6 were produced under the same condition as in Example 2, except that Mn octylate (Example 5) or Fe octylate (Example 6) was used instead of Co octylate.

2. Electrical Conductivity Measurement of Electrode Catalysts 50

Figure 12:
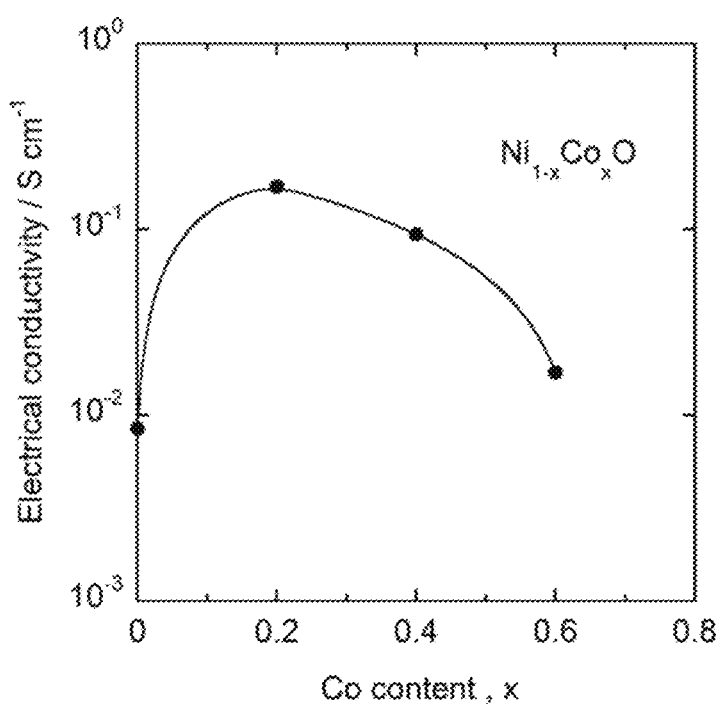
FIG. 12 is a graph showing the relationship between Co content x, and electrical conductivity for the electrode catalyst 50.

The electrical conductivity of the electrode catalysts 50 of Examples 1 to 4 obtained by the above method was measured by the following method. The results are shown in FIG. 12. As shown in FIG. 12, the electrical conductivity was found to be particularly high, reaching 0.1 S/cm or more, when the Co content x is near 0.2.

(Method of Measuring Electrical Conductivity)

8 samples of the electrode catalyst (hereinafter, "subject sample") were weighed precisely using a precision electronic balance and were each filled into 8 sample folders (3 mm in diameter, 5 mm in depth) in a measurement jig. The measurement jig filled with the subject samples was set in a pressing device, and the subject samples were compressed with a force of 1.1 kN. By using an electrode set in the compressor of the pressing device, the resistance of the subject samples was measured by the DC two-terminal method during powder compression, and the length of the subject samples during powder compression was also measured at the same time. These procedures were performed with 4 or more kinds of subject samples with different weight, and the relationship between the length (x-axis) and resistance (y-axis) of the subject samples during powder compression was determined and extrapolated in the y-axis direction to obtain the y-intercept value. From the y-intercept value and the length and cross-sectional area of the compressed powder body, the resistivity of the subject samples was determined, and the electrical conductivity, which is the inverse of the resistivity, was calculated.

3. Measurement of OER activity of electrode catalyst 50

Figure 13:
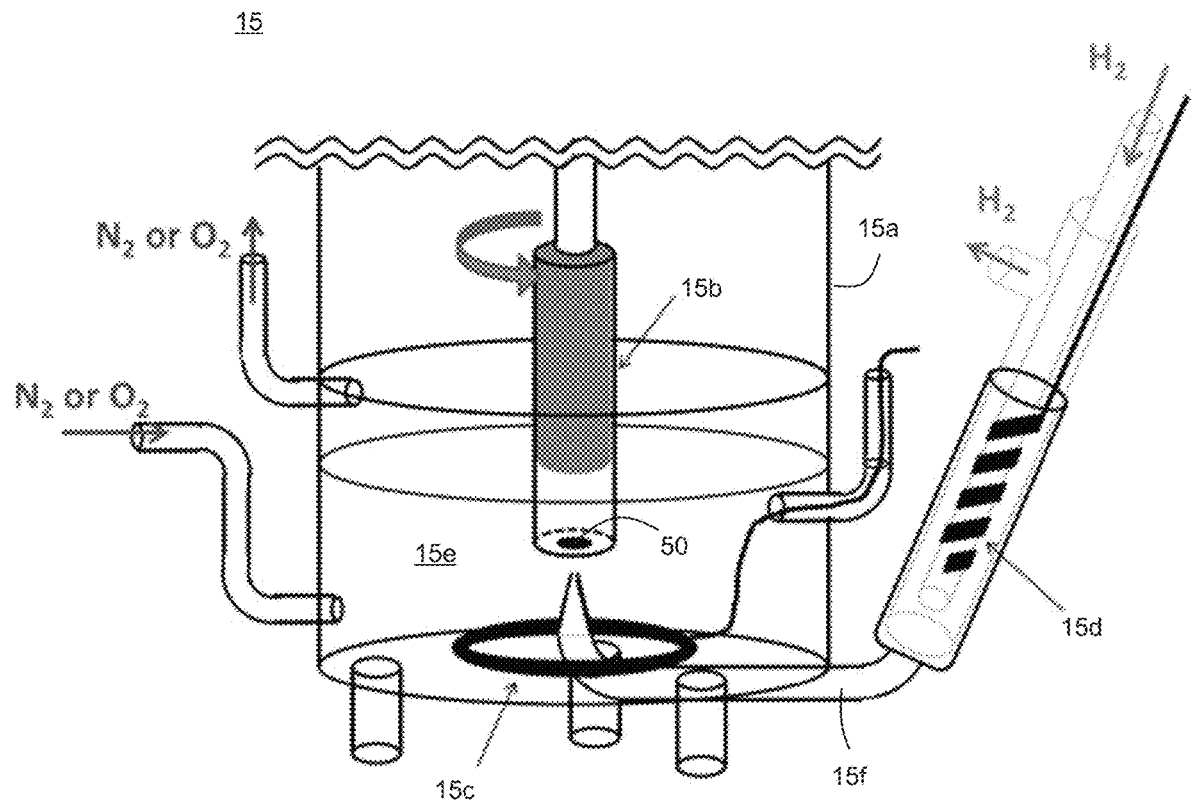
FIG. 13 shows a configuration of an electrochemical measurement apparatus 15 used for OER and HER activity measurement.

Using an electrochemical measurement apparatus 15 of a three-electrode system shown in FIG. 13, the OER activity of the electrode catalysts 50 in Examples 1 to 6 was measured. The apparatus 15 comprises a glass cell 15a, a working electrode 15b, a counter electrode 15c, and a reference electrode 15d. The potential of the working electrode 15b relative to the reference electrode 15d can be adjusted by an unshown potentiostat. A KOH solution 15e with a concentration of 0.1 mol/L is contained in the glass cell 15a. Nitrogen or oxygen can be blown into the KOH solution 15e. The working electrode 15b is made of glassy carbon (GC) and is columnar in shape, and the electrode catalyst 50 is applied to its lower surface. The lower surface of the working electrode 15b and the counter electrode 15c are immersed in the KOH solution 15e. The reference electrode 15d is in a liquid junction with the KOH solution 15e through a salt bridge 15f.

Figure 14A:
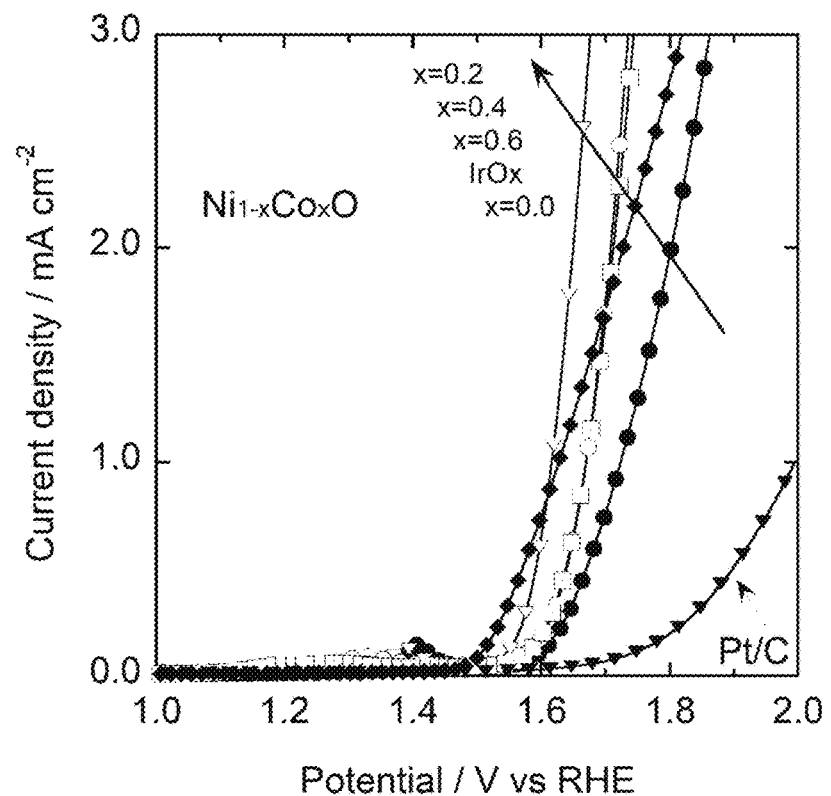
FIG. 14A is a graph of results of the OER activity measurements of the electrode catalysts 50 in Examples 1 to 4.
Figure 14B:
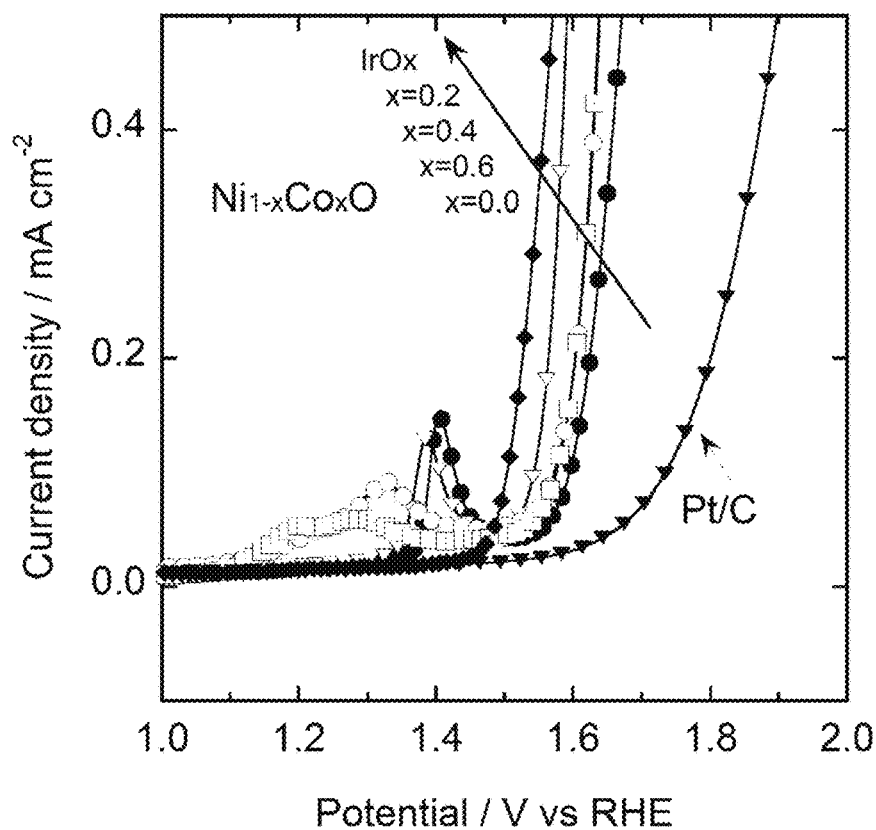
FIG. 14B is a graph of results of the OER activity measurements of the electrode catalysts 50 in Examples 1 to 4.

The electrode catalyst 50 in a state of being dispersed in a mixture of 80 wt % water and 20 wt % ethanol was applied to the lower surface of the working electrode 15b and then dried. Nitrogen was blown into the KOH solution 15e before the measurement to purge the KOH solution 15e. During the measurement, oxygen was blown in at a flow rate of 100 ml/min, and the reference electrode 15d was rotated around its central axis. Under these conditions, the current values were measured while changing the potential of the working electrode 15b relative to the reference electrode 15d (Potential/V vs RHE). The results are shown in FIG. 14A and FIG. 14B (Examples 1 to 4) and FIG. 15 (Examples 1, 2, 5, and 6). FIG. 14A and FIG. 14B also show the results when the catalyst is the Pt/C (manufactured by Tanaka Kikinzoku Kogyo K. K., TEC10E50E), and is $IrO_x$ (manufactured by Tanaka Kikinzoku Kogyo K. K.).

Figure 15:
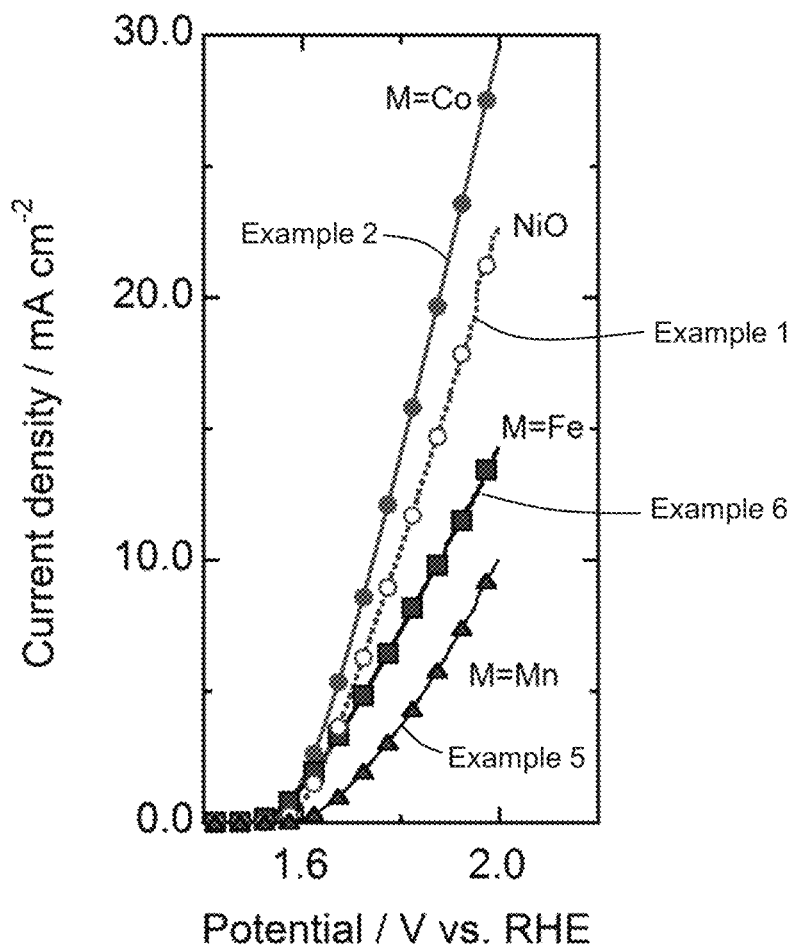
FIG. 15 is a graph of results of the OER activity measurements of the electrode catalyst 50 in Examples 1, 2, 5, and 6.

As shown in FIG. 14A to FIG. 15, the electrode catalyst 50 was found to have a catalytic activity comparable to that of $IrO_x$. The performance was also improved by adding Co and was particularly high when the Co content x was near 0.2.

4. Measurement of HER Activity of Electrode Catalyst 50

Using the same apparatus as for the OER activity measurement described above, the HER activity of the electrode catalyst 50 was measured. The potentiostat was set so that the potential of the working electrode 15b is negative. The results are shown in FIG. 16A and FIG. 16B (Examples 1 to 4) and FIG. 17 (Examples 1, 2, 5, and 6).

Figure 16A:
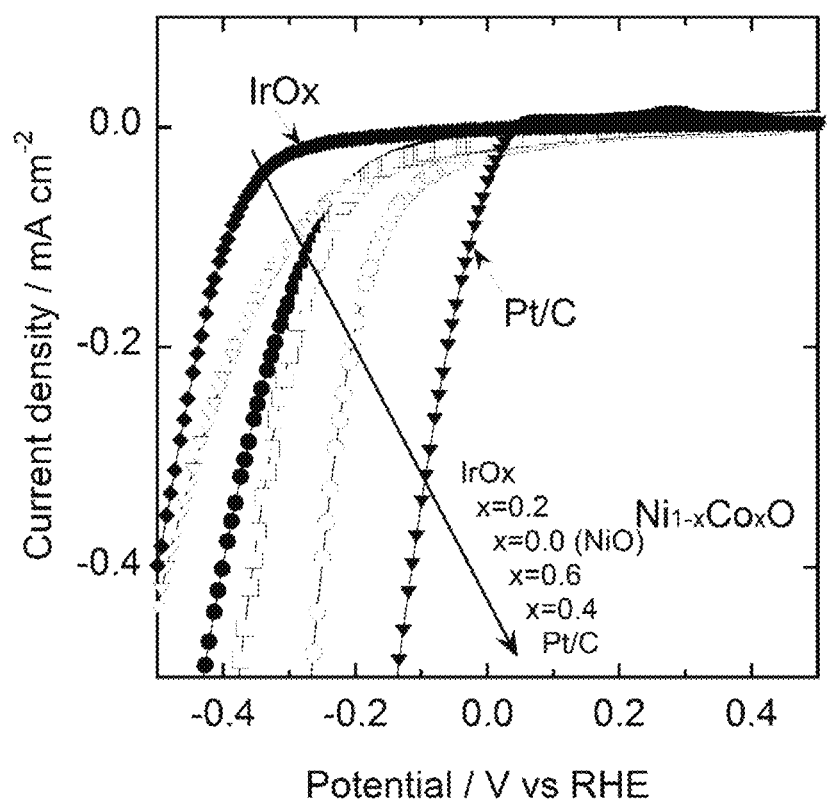
FIG. 16A is a graph of results of the HER activity measurements of the electrode catalyst 50 in Examples 1 to 4.
Figure 16B:
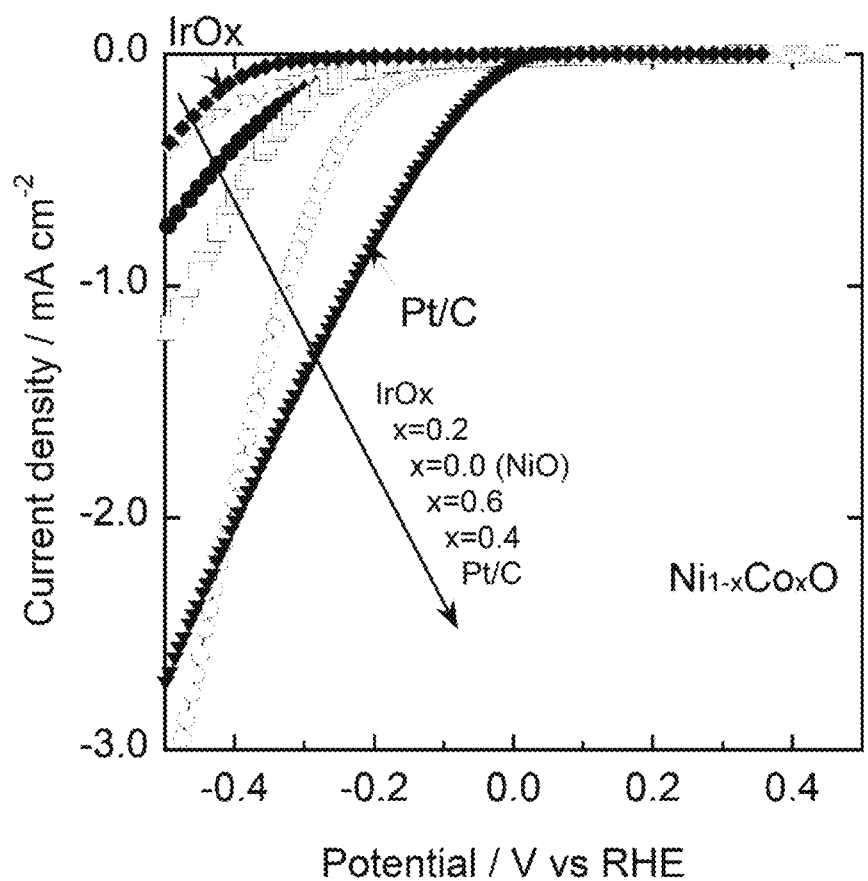
FIG. 16B is a graph of results of the HER activity measurements of the electrode catalyst 50 in Examples 1 to 4.
Figure 17:
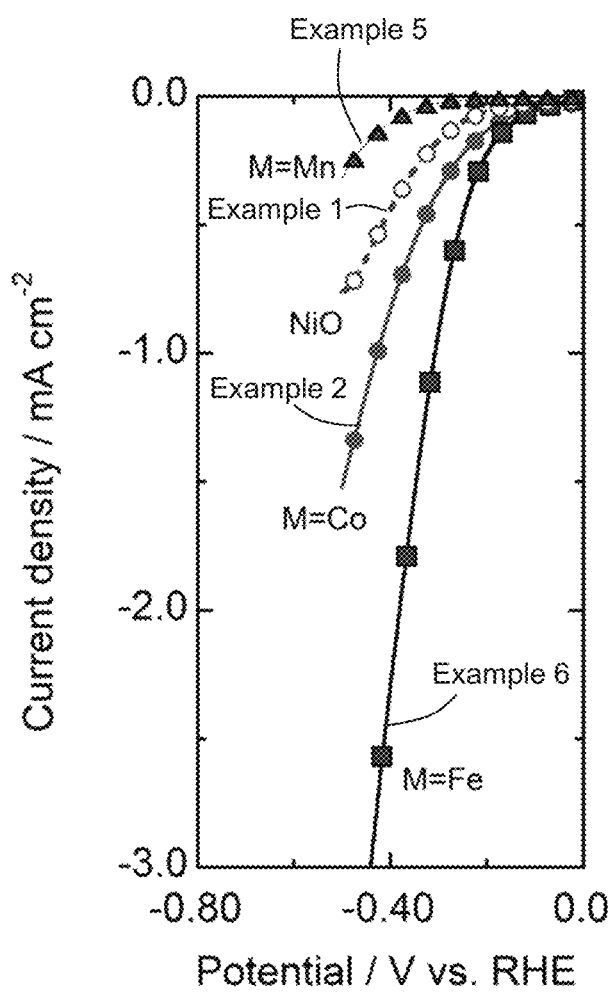
FIG. 17 is a graph of results of the HER activity measurements of the electrode catalyst 50 in Examples 1, 2, 5 and 6.

As shown in FIG. 16A to FIG. 17, the electrode catalyst 50 was found to have excellent catalytic activity at the level intermediate between $IrO_x$ and Pt/C. The addition of Fe or Co significantly improved the performance, and the addition of Fe improved the performance particularly significantly. When Co was added, the performance was particularly high when the Co content x was near 0.4.

5. Voltage-Current Density Characteristic Evaluation of Water Electrolysis Cell

Figure 18:
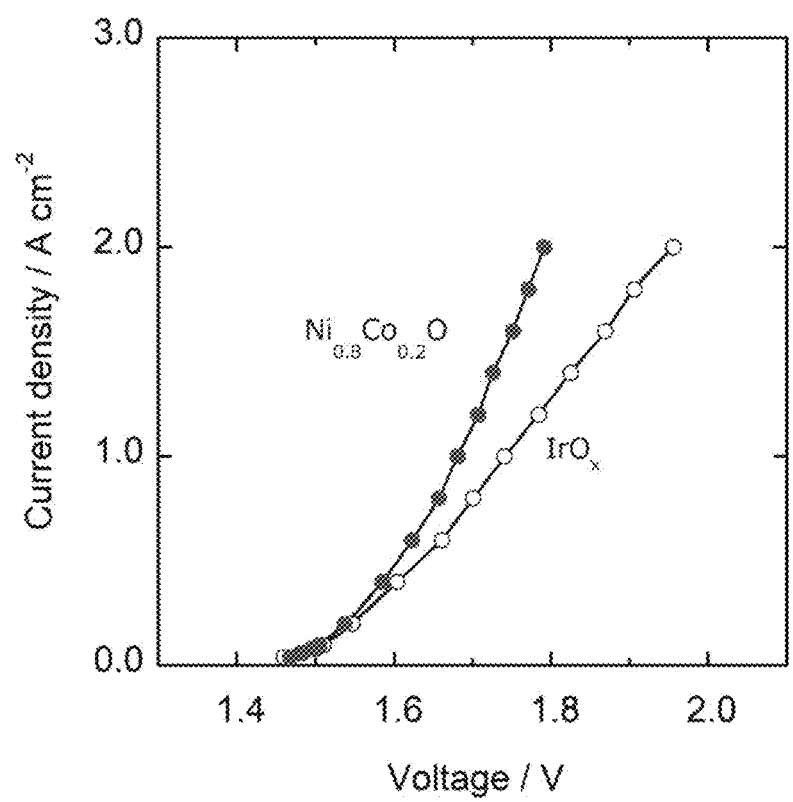
FIG. 18 is a graph of results of a voltage-current density characteristic evaluation of a water electrolysis cell in which an anode catalyst is the electrode catalyst 50 ($Ni_{0.8}Co_{0.2}O$) of Example 2.

In the water electrolysis cell shown in FIG. 1, Pt/C (manufactured by Tanaka Kikinzoku Kogyo K. K., TEC10E50E) was used as the cathode catalyst, and the electrode catalyst 50 ($Ni_{0.8}Co_{0.2}O$) of Example 2 or a commercial $IrO_x$ catalyst (manufactured by Tanaka Kikinzoku Kogyo K. K.) was used as the anode catalyst. The relationship between the voltage applied between the anode and the cathode and the current flowing during the water electrolysis reaction was measured at 80° C., and the results are shown in FIG. 18. As shown in FIG. 18, the water electrolysis cell using the electrode catalyst 50 in Example 2 had a larger water electrolysis reaction rate and higher catalytic performance than the water electrolysis cell using the $IrO_x$ catalyst.

6. Long-Term Evaluation of Water Electrolysis Cell

A long-term evaluation of the water electrolysis cell produced in "5. Voltage-current density characteristic evaluation of water electrolysis cell" was performed. The anode catalyst was the electrode catalyst 50 ($Ni_{0.8}Co_{0.2}O$) of Example 2.

Figure 19:
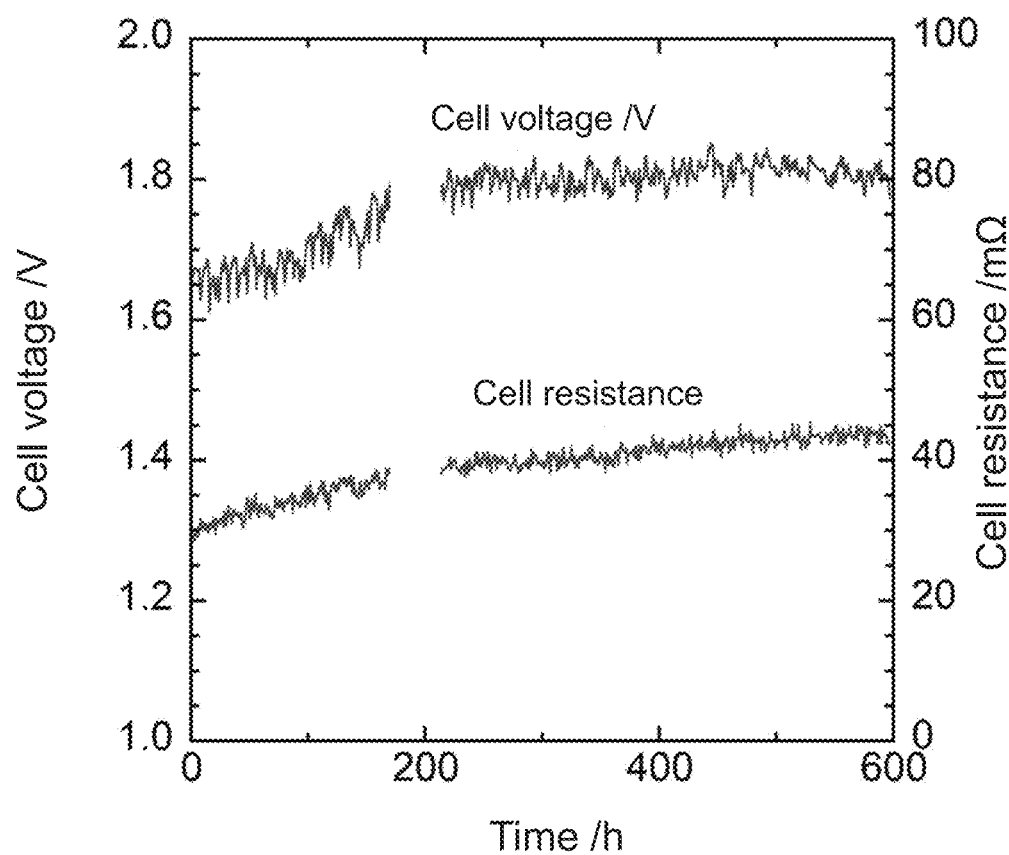
FIG. 19 is a graph of results of a long-term evaluation of the water electrolysis cell in which the anode catalyst is the electrode catalyst 50 ($Ni_{0.8}Co_{0.2}O$) of Example 2.

In this evaluation, the resistance (cell resistance) between the anode and the cathode was measured while a voltage (cell voltage) was applied between the anode and the cathode at 80° C. The results are shown in FIG. 19. As shown in FIG. 19, neither the cell voltage nor the cell resistance changes significantly after 600 hours. This indicates that the electrode catalyst 50 of the present invention has excellent durability.

REFERENCE SIGNS LIST

1: producing apparatus, 2: burner, 2a: burner gas, 3: raw material supplying unit, 4: reaction tube, 5: collector, 5a: filter, 5b: gas discharging portion, 6: gas reservoir, 6a: cold gas introducing portion, 6b: slit, 6c: inner peripheral wall, 6d: burner insertion hole, 6g: cold gas, 7: flame, 8: crystallite, 9: oxide particle, 10: anion exchange membrane electrochemical cell, 13: outer tube, 13a: mist gas, 14: raw material distribution tube, 14*a*: raw material solution, 14*b*: mist, 15: electrochemical measurement apparatus, 15*a*: glass cell, 15*b*: working electrode, 15*c*: counter electrode, 15*d*: reference electrode, 15*e*: KOH solution, 15*f*: salt bridge, 20: cathode, 21: diffusion layer, 22: microporous layer, 23: catalyst layer, 30: anode, 31: diffusion layer, 32: microporous layer, 33: catalyst layer, 40: anion exchange membrane, 50: electrode catalyst, 60: porous material, 61: substrate, 62: pore, 70: powder, 80: fine particle, 81: gap, 82: primary particle, 83: chain part, 84: void, 85: branching point, 90: core part, 91: skin layer.

The invention claimed is:

1. An anion exchange membrane electrochemical cell, comprising a cathode, an anode, and an anion exchange membrane arranged therebetween, wherein at least one of the cathode and the anode comprises a catalyst layer structured with an electrode catalyst, the electrode catalyst structured with a void-containing body having a void, wherein:

the void-containing body comprises a core part and a skin layer covering the core part;

the core part is structured with metal;

the skin layer is structured with an oxide containing Ni;

the void-containing body is structured with fine particles themselves acting as a catalyst; and the fine particles comprise the core part and the skin layer.

2. The electrode catalyst of claim 1, wherein the fine particles are structured with a plurality of primary particles being fusion bonded to form a chain.

3. The electrode catalyst of claim 1, wherein the oxide contains a transition metal whose atomic number is smaller than that of Ni.

4. The electrode catalyst of claim 3, wherein the transition metal is Co or Fe.

5. The electrode catalyst of claim 1, wherein the void-containing body has a void ratio of 20% or more.

6. The anion exchange membrane electrochemical cell of claim 1, wherein the anion exchange membrane electrochemical cell is a water electrolysis cell.

7. The anion exchange membrane electrochemical cell of claim 1, wherein the anion exchange membrane electrochemical cell is a fuel cell.

* * * * *